United States Patent [19]

Hildebrandt et al.

[11] 3,861,022

[45] Jan. 21, 1975

[54] METHOD OF MAKING INSULATED DUCTS

[75] Inventors: Ullrich Hildebrandt, Munich; Albert Hofmann, Grunwald, both of Germany

[73] Assignee: Linde Aktiengesellschaft, Wiesbaden, Germany

[22] Filed: Aug. 8, 1973

[21] Appl. No.: 386,610

[30] Foreign Application Priority Data

Sept. 27, 1972 Germany.............................. 2247220

[52] U.S. Cl...................... 29/455, 52/404, 138/149
[51] Int. Cl...................... B21d 39/00, B23p 19/04
[58] Field of Search........ 29/455, 445; 52/404, 621; 219/101, 107; 138/149

[56] References Cited
UNITED STATES PATENTS

| | | | |
|---|---|---|---|
| 2,379,645 | 7/1945 | Morris | 219/101 |
| 2,993,110 | 7/1961 | Godley | 52/404 X |
| 3,369,826 | 2/1968 | Boosey et al. | 138/149 X |
| 3,442,417 | 5/1969 | Pallanz | 29/455 X |
| 3,579,802 | 5/1971 | Gajouski | 29/455 X |
| 3,702,024 | 11/1972 | Baker | 29/455 X |

*Primary Examiner*—Charlie T. Moon
*Attorney, Agent, or Firm*—Karl F. Ross; Herbert Dubno

[57] ABSTRACT

A method of making insulating ducts especially for the flow of low-temperature fluids such as liquefied gases, comprises forming an insulating layer between inner and outer tubes piercing the insulating layer from the exterior and anchoring holders at their inner ends in the holes pierced in the insulation for spacing the two tubes apart. The piercing is by an open flame or a heated rod or piston, preferably using a template for the appropriate spacing of the holes through which the holders pass.

9 Claims, 7 Drawing Figures

METHOD OF MAKING INSULATED DUCTS

FIELD OF THE INVENTION

Our present invention relates to a method of or a process for the production of thermally insulated ducts, especially for the flow of low-temperature fluids such as liquefied gases, and more particularly, to the formation of ducts having an inner metal tube, an outer metal tube or casing, a layer of insulation between the tubes and holders bridging the tubes and traversing the insulating layer.

BACKGROUND OF THE INVENTION

For the conduction of low-temperature fluids, especially liquefied gases, it has been proposed heretofore to provide a layer of thermal insulation in an evacuated space between inner and outer casings or tubes of metal, holders being provided which bridge the two casings or tubes and center the inner tube within the outer casing or position the outer casing with respect to the inner tube so that the two tubes remain generally coaxial. The spacing means may include a band helically wound in the gap between the two tubes for maintaining the spacing between them, the band consisting of a multiplicity of layers of thermally insulating material or of a material with a low thermal conductivity. The manufacture of such pipes is difficult and, especially when the duct is to be bent, the spacer band may be crushed or compressed to reduce its insulating capacity or increase its thermal conductivity. When the band is wound with turns in continuous relationship, the bending may also provide gaps between the turns through which radiant loss is permitted, thereby causing the influx of heat or the loss of cold and requiring the refrigerator units commonly provided along a duct of this type, e.g., in the transport of liquefied natural gas, to be of greater dimension and capacity than would otherwise be necessary.

OBJECTS OF THE INVENTION

It is the principal object of the present invention to provide an improved method of or process for the production of thermally insulated ducts, especially for the transport of low-temperature fluids such as liquefied gases, in which the aforementioned disadvantages are obviated.

Yet another object of the invention is to provide a method of making a thermally insulated duct system which is simpler than prior techniques and yet is able to produce efficiently and effectively insulated ducts in spite of the bends or the like which may be applied thereto.

Still another object of the invention is to provide a process for making a duct system for a low-temperature fluid medium which is relatively simple and yet has maximum insulating capability.

SUMMARY OF THE INVENTION

These objects are attained, in accordance with the present invention, by providing a layer of thermal insulation around an inner tube or casing of metal (through which the low-temperature medium is transported) and piercing the layer of thermal insulation from the exterior at spaced-apart locations to form passages in which holders bridging the two tubes or casings are anchored. Preferably the passages are burnt through the layer and the spacers, holders or anchors are affixed at one end to the inner casing or tube or to a sheath surrounding same within the insulating shell provided for the purpose of attaching the holder. At its outer end, each holder may be in direct or indirect engagement with the outer casing or shell.

The duct system produced in this manner, which is effective for extremely cold fluids such as liquefied helium has a number of advantages. Firstly, the application of the thermal insulation is not limited by the holders to be used or the system for anchoring the holders between the casings. The thermal insulation can, for example, comprise alternating layers of a low-conductivity fabric or fiber materials and high-heat reflectivity metal foils which may be applied in a continuous sheath, one or more helically wound layers in the same or opposite senses, or in any other form totally independently of the holder arrangement. In prior-art systems, the application of the insulating layer required careful consideration of the holder system and was limited in the nature of the insulation and the manner of its application by the holder arrangement.

Secondly, the process can be effected using apparatus of low capital cost and with the formation of negligible thermally conducting bridges between the inner and outer casings or tubes.

As soon as the thermal insulating layer is completely applied, the passages running from the exterior to the interior of the insulating layer are formed by burning them through the insulating layer. The burning of the passages has the advantage that the sensitive insulating layer receives no significant pressure during the piercing operation and hence does not have diminished insulating effectiveness in the region of the passages. The passages preferably are of a circular cross-section and of a diameter which approaches the diameter of the spacers or holders which may be even perpendicular to the longitudinal axis of the duct system or, when axial stresses are contemplated, may be inclined at angles thereto. The spacers in any event preferably lie in axial planes of the duct.

The passages may be formed, according to the invention, by rod-like burners generating an open flame or rod-like heated pistons or plungers.

As soon as the passages are burnt through the thermal insulation, the spacers or holders are inserted and are anchored at one end with the inner casing. Preferably the spacers are only stressed under tension so that they may be relatively thin wires of low thermal conductivity. The use of spacers only under tension provides the advantage that the diameter of the passage can be held small, thereby reducing cold losses by thermal radiation through the passages. Where conventional systems provided spacers under compressive stress, larger cross-section passages were required and thus greater cold loss was the rule.

The holders or spacers can be affixed to the inner casing by any of a number of techniques. For example, the spacers may engage small fastening elements, such as hooks, eyes or loops formed directly on the exterior of the inner casing. Alternatively the fastening elements in which the holders are hung can be provided on a carrier especially provided along the exterior of the inner shell. In this case, the fastening elements may correspond in number and distribution to the number and distribution of the holders or spacers. This system has the slight disadvantage that the burning-piercing of the passages must be carried out carefully to ensure alignment of the passage with the fastening element. This disadvantage can be obviated when the burning-piercing of the insulating layer is effected to a template which is applied to the exterior of the insulating layer and has markings, e.g., openings, aligned with the fastening elements of the inner shell.

It has been found to be advantageous, when a large number of holders are to be used, to distribute the fastening elements uniformly over the exterior of the inner casing or tube so that the probability of registry of a fastening element with a passage burnt through the insulation is substantially unity.

This can be insured when the carrier is a perforated sheath surrounding the inner casing or tube and having a relatively high hole density or distribution and the cross-section of the passage burnt in the insulating layer is approximately equal to that which will insure that the holder or spacer member can be hooked around the edge of a hole in the sheath. The probability that the edge of a hole engageable by a holder will be exposed through any passage formed in the insulating sheath should be equal to unity.

The carrier or sheath may be a cylinder or a helically wound perforated band of metal whose turns are laterally contiguous. Instead of a perforated cylinder or band, however, a wire-mesh structure may be employed.

It has also been found to be advantageous to entrain the holder with the piercing member during the piercing operation through the insulating layer and then to affix the holder to the inner casing or tube when the passage is completely burnt through. This results in a saving of one operation.

The holders or spacers may be welded or cemented to the outer wall of the casing or to a carrier sheath and it has been found to be advantageous to provide a heating action by the open flame of the burner, subsequent to the piercing of the insulating layer thereby, to melt a portion of the casing wall and form a pool of metal in which the holder or spacer is seated for bonding to the casing or a carrier disposed therearound. Welding may also be effected by passing the holder or spacer through a hollow electrode and spot welding it in place to the inner casing or a protective sheath therearound. Outer carriers can then be applied to the spacer members and the outer casing mounted thereon.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
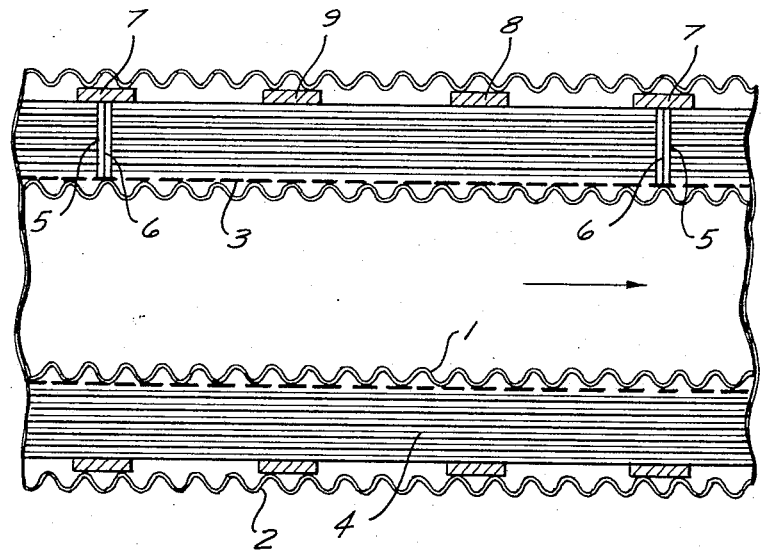
FIG. 1 is a diagrammatic axial cross-section through an insulated duct according to the invention.

In FIG. 1 of the drawing, we have shown a duct system which comprises a corrugated inner tube or casing 1 coaxially surrounded by a corrugated outer tube or casing 2, the space between the casings being evacuated or sealed in the usual manner. Liquid helium traverses the inner casing in the direction of the arrow and along the exterior of the inner casing we provide a screen 3 of wire mesh. Insulating layers 4 alternately consisting of woven or nonwoven fabric of a thermally nonconductive material and metal foil are represented at 4 and constitute the cylindrical insulating body which surrounds the inner casing 1. A multiplicity of passages 5 are burnt through the body and spacer elements or holders 6 are inserted through these passages and are hung in the screen 3 of wire mesh. At their outer ends, the elements 6 are affixed to annular carriers 7 which surround the body of insulation and support the outer casing 2 which is mounted upon the rings 7. Similar rings are provided at 8 and 9 and are secured to holders 6 which are offset from one another and the holders of ring 7 by 120° about the axis of the duct. The holders 7, 8 and 9 have a width which is equal at least to the cast-cast spacing of the corrugations of the outer casing 2.

Figure 2:
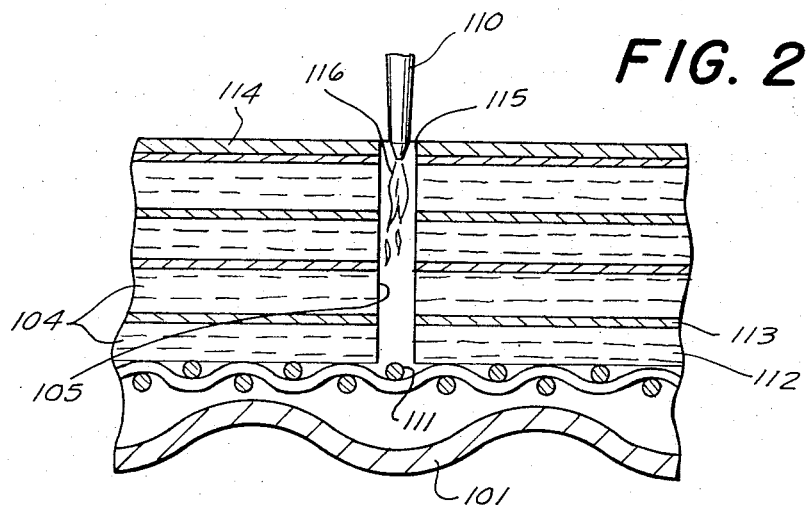
FIG. 2 is a diagrammatic section through a portion of the wall of the inner casing of a duct illustrating the practice of the invention in accordance with one embodiment thereof.

As can be seen in FIGS. 2, the passage 105 formed in the layers of insulation 104 upon withdrawal of the open flame burner 110 can permit a holder to be passed through the insulation and hooked around one of the strands 111 of the wire mesh sheath 103 surrounding the inner duct 101. Each of the insulating layers comprises a fibrous or fabric layer 112 of fiber glass or another fusible fiber or of a thermoplastic synthetic resin, bonded to a layer 113 of aluminum foil or other reflective material. A template 114 may be provided around the body of insulation and can be formed with holes 115 or other markings to permit the burner 110 having an open flame 116 to form the passage 105 directly in line with a fastening element provided on the inner casing or the sheath surrounding same.

Figure 3:
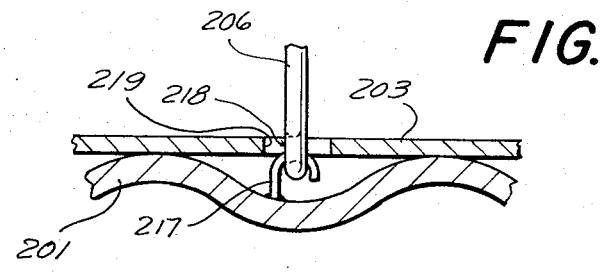
FIG. 3 is a diagrammatic cross-section showing one technique for anchoring the holder or spacer element of the present invention to the inner casing.

A system of the latter type has been illustrated in FIG. 3 in which the inner casing 201 is formed at spaced-apart locations with small fastening elements 217, e.g., hooks in which an eye 218 of the spacer element or holder 206 is engaged. Of course, the inner casing 201 may be provided with an eye, in which case element 206 will be formed with the hook. Furthermore, the protective sheath 203, here a perforated plate, may be formed with an opening 219 affording access to the hook 217 or may itself be engaged by a hook at the end of the spacer element 206.

Figure 4:
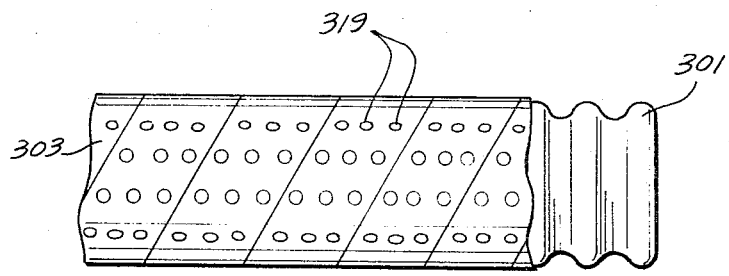
FIG. 4 is an elevational view, partly broken away, of an inner duct provided with a protective sheath in the form of a helical strip.

In FIG. 4 we show a system in which the inner duct 301 is surrounded by a helically coiled perforated metal strip 303, the perforation 319 of which can be engaged by hooks at the ends of spacers and which are provided in such profusion that, regardless of where a passage is pierced in the insulating layer, a portion of a hole of the sheath 303 will be exposed for engagement by a spacer element.

Figure 5:
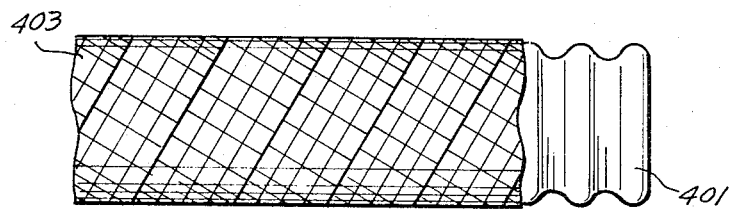
FIG. 5 is a view similar to FIG. 4 but illustrating an embodiment of the invention in which the protective inner sheath is formed from wire mesh.

FIG. 5 shows that the inner duct 401 may be surrounded by a screen in the form of a helically coiled wire mesh sheath 403, the spacer 6, 206 etc. being hooked into the wire mesh.

Figure 6:
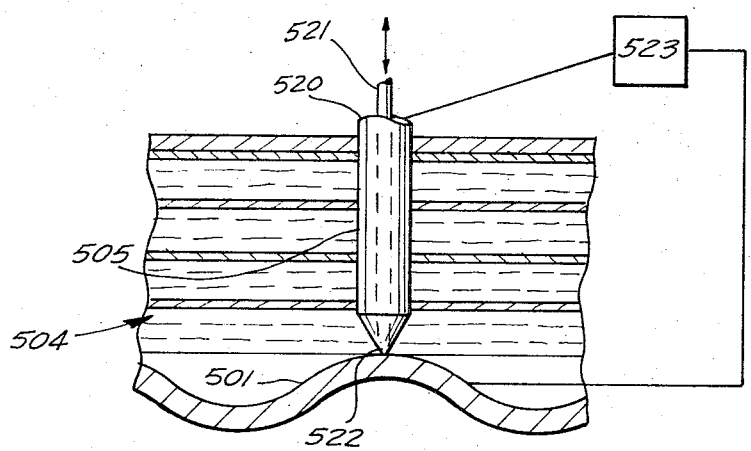
FIG. 6 is a view similar to FIG. 2 illustrating another embodiment of the invention.

In FIG. 6 we have shown diagrammatically an arrangement wherein the passage 505 pierced in the insulating body 504 around the inner casing 501 is formed by a heated rod or plunger 520 through the interior of which a spacer element 521 is fed. After the heated rod has penetrated the insulating body, it engages with its tip 522 the inner casing 501 and heats the latter under the principles of electrical spot-welding from a spot-welding source 523 to fuse the end of the rod 521 to the body 501.

Figure 7:
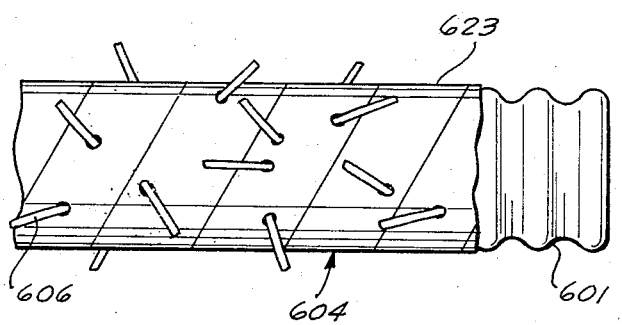
FIG. 7 shows the orientation of the holder elements as they project through an insulating layer before being anchored to an outer retainer over which the outer casing is applied.

FIG. 7 shows a plurality of rods 606 projecting at various angles to the duct axis from the body of insulation 604, which is illustrated to be deposited in a plurality of helical layers with contiguous turns around the inner pipe 601. The turns 623 have not yet been heat-pierced and thus have not received the respective element 606. After the latter are anchored in rings such as have been described in connection with elements 7, 8 and 9 of FIG. 1, any excess length is cut off. The members 606 are secured to rings 7, 8 and 9 so as to be constantly under tension.

We claim:

1. A method of making an insulated duct, comprising the steps of:
   surrounding an inner casing with an insulating body;
   burning passages at spaced-apart locations through said body from the exterior inwardly;
   inserting spacer elements through said passages and anchoring said spacer elements to said inner casing at one end; and
   supporting an outer casing around said body on the other ends of said elements.

2. A method defined in claim 1 wherein said elements are anchored to said inner casing by enveloping same with a sheath and securing said elements to said sheath.

3. The method defined in claim 2 wherein said sheath is perforated and said elements are hung in perforations of said sheath.

4. The method defined in claim 2 wherein said sheath is wrapped helically around said inner casing as a perforated band.

5. The method defined in claim 4 wherein said perforated band is composed of wire mesh.

6. The method defined in claim 3 wherein said passages are burnt through said body with an open flame.

7. The method defined in claim 3 wherein said passages are burnt through said body by thrusting a heated plunger therethrough.

8. The method defined in claim 3 wherein said elements are passed through said passages concurrently with the formation thereof.

9. The method defined in claim 3 wherein said elements are secured to said inner casing by thermally or adhesively bonding an end of each element.

* * * * *